United States Patent [19]

Dick et al.

[11] Patent Number: 5,016,869
[45] Date of Patent: May 21, 1991

[54] HUMAN BIPEDAL LOCOMOTION DEVICE

[75] Inventors: G. John Dick, Claremont; Eric A. Edwards, Menlo Park, both of Calif.

[73] Assignee: Applied Motion, Claremont, Calif.

[21] Appl. No.: 548,161

[22] Filed: Jul. 3, 1990

Related U.S. Application Data

[63] Continuation-in-part of Ser. No. 375,955, Jul. 5, 1989, abandoned.

[51] Int. Cl.[5] .................... A63B 25/00; A63B 25/02; A63B 25/06
[52] U.S. Cl. .................... 272/70; 272/70.1; 272/70.3
[58] Field of Search .................... 272/70, 70.1, 70.2, 272/70.3, 70.4; 623/30, 24, 26

[56] References Cited

U.S. PATENT DOCUMENTS

| 173,100 | 3/1875 | Lynch. | |
|---|---|---|---|
| 406,328 | 7/1889 | Yagn | 272/70 |
| 420,179 | 1/1890 | Yagn | 272/70 |
| 440,684 | 11/1890 | Yagn | 272/70 |
| 539,872 | 5/1895 | Kheiralla | 272/70 |
| 1,308,675 | 7/1919 | Kelley | 272/70 |
| 1,575,847 | 3/1926 | King et al. . | |
| 2,010,482 | 8/1935 | Cobb | 272/70 |
| 2,172,000 | 9/1936 | Wenker . | |
| 2,210,269 | 8/1940 | Taylor | 128/80 R |
| 2,345,085 | 3/1944 | Albert et al. . | |
| 2,723,855 | 3/1954 | McKee . | |
| 2,792,052 | 5/1957 | Johannesen | 297/DIG. 4 |
| 2,802,217 | 8/1957 | Wihloyte . | |
| 3,065,962 | 11/1962 | Hoffmeister . | |
| 3,110,492 | 9/1963 | Hoffmeister . | |
| 3,371,927 | 11/1968 | Ryan et al. . | |
| 3,388,485 | 2/1969 | Pierce . | |
| 3,751,032 | 8/1973 | Boyle . | |
| 3,954,195 | 5/1976 | Deuchar | 297/DIG. 10 |
| 4,133,086 | 2/1979 | Brennan . | |
| 4,390,076 | 6/1983 | Wier et al. | 280/304.1 |
| 4,872,665 | 10/1989 | Chareire | 272/70 |

FOREIGN PATENT DOCUMENTS

| 247482 | 5/1912 | Fed. Rep. of Germany | 272/70 |
|---|---|---|---|
| 1437046 | 11/1988 | U.S.S.R. | 272/70 |

Primary Examiner—Richard J. Apley
Assistant Examiner—Karen G. Horowitz
Attorney, Agent, or Firm—Christie, Parker & Hale

[57] ABSTRACT

A self-actuated spring-action human bipedal device includes a back-mounted frame attached to the upper torso of a user, and separate articulated right and left leg frames pivotally attached by U-joints to lower portions of the back frame. The user's feet are secured to the leg frames so the bottoms of the leg frames contact the ground, behind and below the point where each foot is attached to its leg frame. Endless cord-like main springs are engaged with a spring actuator, which are carried on the back frame. Left and right tension lines running from respective leg frames to the spring actuator are arranged so that compression of the leg frames, caused by the force of downward movement of the user's feet and torso, pulls on the tension lines to apply a pulling force to the spring actuator for stretching the main springs. The tension lines are also each attached to a part of the leg frame which engages on the user's foot so that extension of the user's leg pulls on the tension lines, also stretching the main springs. The energy stored in the stretched main springs is then transferred back to the torso of the user and to the user's feet to cause the user to jump into the air. Separate pick-up springs connected to each leg frame keep the tension lines under positive tension and apply a pick-up force to the leg frame to raise it and prevent dragging.

27 Claims, 9 Drawing Sheets

HUMAN BIPEDAL LOCOMOTION DEVICE

CROSS-REFERENCE TO RELATED APPLICATION

This is a continuation-in-part of our application Ser. No. 07/375,955, filed July 5, 1989, abandoned, which is incorporated herein by this reference.

FIELD OF THE INVENTION

This invention relates to devices for enhancing human bipedal locomotion. More particularly, the invention relates to a mechanical device which allows trampoline-like jumps with either or both feet as well as large steps in an otherwise normal walking or running motion.

BACKGROUND OF THE INVENTION

In the past, various mechanical devices have been developed to assist humans in walking, running, or jumping. These devices are normally used for sports or other amusement purposes, or for the aid of persons who are partially disabled. Typically, these devices include mechanical linkage together with springs or other energy control devices to enhance the physical capability of the user's legs. Motion of the legs may be enhanced and assisted in three basic directions; extension and retraction, side-to-side, or fore-and-aft. Some devices are designed for high performance and an enhanced mobility above and beyond that for which an ordinary person would normally be capable. These typically enhance and assist only extension and retraction, with side-to-side and fore-and-aft motions effected more or less directly by similar motions of the user's legs. We concern ourselves primarily with devices of this form. The enhancement may take one of several basic forms.

One type of device links the user's torso to his feet, which engage the ground more or less directly, and acts to enhance the strength of the user's legs by adding to the force that the user applies with his own legs. This first type, then, uses linkage that allows a spring, or other energy control device, to act in parallel with his own legs to enhance their capability. This type of device can recover energy of downward motion of the user and return it, or add to it by means of a primary power source, when he springs up again. It gives the user the advantages of added strength and of safety because the added forces are not transmitted by his legs. Disadvantages are: (1) while leg forces are enhanced, the effective leg extension remains unchanged; (2) unless a means of disengagement is provided, the force provided by the device may prevent user from picking up the foot not engaging the ground and so will prevent a normal walking or running motion. The means of disengagement typically has an all-or-nothing character and is switched on or off depending on some physical condition such as, e.g., which leg is farther forward. Thus, a further disadvantage is that the device is variable in its response and can give unpredictable results in some circumstances. The recent U.S. Pat. No. 4,872,665 by Chareire is an example of this type of device.

A second type of device is mounted to the user's legs or feet, and engages the ground instead of the user's own feet with a varying length that adds to the extension of his own legs. This device is designed to effect a spring action or otherwise enhanced action between the user's feet and the ground. This action acts in series with the action of his own legs to enhance their capability. This type of device is able to recover the energy of downward motion of the user and return it when he springs up again and has the advantage of increased extension compared to the user's own legs. Disadvantage are: (1) while leg extension is enhanced, all of the force must be supplied by his own leg; (2) side-to-side and fore-aft bending moments on the user's knee may be increased due to the extra length, thus increasing the danger to the user; and (3) substantial compression of the spring action for either leg will cause the apparatus for the other leg to tend to drag on the ground due to its extra length and so interfere with a normal walking or running motion. U.S. Pat. Nos. 3,065,962 and 3,110,492 by Hoffmeister are examples of this type of device.

A third type of device combines features of the first two types. It attaches both to the torso and the feet while also at extending with variable length beyond the user's own feet, engaging the ground independently of the user's own feet. With attachment at the torso, an additional force can be applied to add to that supplied by the user's leg, while the variable length extension can increase the leg's extension. Rather than acting only in parallel or in series with the action of the user's leg, this type of device allows springs or other energy control devices to act both in parallel and in series with his leg. This type of device can recover energy of downward motion of the user and return it, or add to it by means of a primary power source, when he springs up again. It offers the user the advantages of added strength and of safety, because the added forces are not transmitted by his legs; also the advantage of increased extension compared to his own legs. A further advantage is that increased side-to-side and fore-aft bending moments and caused by increased leg length may be applied not to the user's knee but only between his feet and torso with the device providing side-to-side and fore-aft rigidity.

A previous example of this third type, U.S. Pat. No. 406,328 by Yagn, uses a particular form of parallel and series connections involving two separate springs for each leg. In this case, one spring was arranged to act between the user's foot and a ground-contacting element while a second acted between the torso and the ground-contacting element. This device uses one spring in series with the user's leg while the second acts in parallel with the leg and also with the first spring. Disadvantages of this example include the problems of both of the first two types of device relating to foot dragging and foot raising. When raising a foot in order to take a step, the spring attached to the torso acts to prevent the foot from raising, and so a means for alternately engaging and disengaging that spring was implemented. The lack of flexibility and predictability inherent in such a system is a serious disadvantage. For example, the torso spring must surely disengage or the leg cannot be picked up, and the spring must surely engage or the expected spring force is missing. Additionally, foot dragging limits the performance of this device, by limiting the compression which is acceptable between the foot and the ground for the load bearing leg to an amount the user can compensate by lifting high his other foot.

The present invention also provides a human mechanical bipedal device of the third type described above. It differs from the previous example in ways that address and eliminate the disadvantages relating to foot dragging and foot raising while preserving the advantages for devices of this third type. Its primary distinguishing features are:

Firstly, the mechanism for each leg effects a lever action with mechanical advantage greater than 1:1 in series with a spring action. The lever action increases the force exerted by the user's leg while the spring action enhances its extension. Requiring only one spring, such a mechanism effects spring action both in series and in parallel with the user's leg. The increase in force generated by the leverage action is transmitted directly between the ground and the user's torso, for increased strength while the spring action in series with his leg acts to allow increased extension. In contrast to previous examples of the first and third types, this action allows the user to freely pick up his foot at any time, and so can be engaged at all times for greater safety, predictability, and flexibility of operation.

Secondly, a common main spring is used for the two legs which act on it in parallel to allow compression of the two legs to be coordinated and so prevent foot-dragging induced by substantial compression of one leg against the ground. Together with the action described in the previous paragraph, a leveraged action for each leg is provided which acts in series with a common main spring. Thus, if either leg is raised, the device for that leg will be raised above the ground with respect to that for the other leg irrespective of any compression allowed by the spring action.

This new device has all of the advantages described above for devices of the third type. They make possible higher performance than would otherwise be possible together with flexibility and predictability of operation. Safety is also enhanced due to protection of the user's leg and leg joints from increased forces and bending moments. Additionally, use of a single spring used alternately by the two legs reduces the weight associated with a large spring element with high energy storage capacity. With the spring element carried on the user's back, the weight of the legs is reduced for increased agility. A disadvantage is that without added power and with legs longer than the user's legs, their response to foot pickup is smaller than that of his own leg due to the effects of leverage, which adds difficulty in negotiating uneven terrain and hampers recovery when falling.

Large jumps off either or both feet are made possible by this invention, as are large jumping steps with an otherwise normal walking or running motion. To achieve these objectives, a number of problems must be overcome. The device must balance or distribute lift forces acting on the body to prevent undue force on the body so the device is safe and manageable and will not prevent a normal walking or running motion. Since the device adds weight to the body of the user, it must be reasonably light in weight so that undue fatigue will not become a problem with extended use. The device should also respond quickly to bodily movements and not prevent running or walking with a normal motion. It should also allow normal fore-and-aft and side-to-side motion of either leg. Undue shock forces should also not be transferred directly to the body of the user. In addition, impact forces should not place undue stress on the body such as the knee joints, for example.

The human bipedal device of this invention overcomes problems by providing enhanced walking, running, or jumping over various types of terrain with a natural motion characterized by controlled trampoline-like jumps. By way of example, one embodiment of the device allows the user to jump four or five feet vertically with both legs, or single leg jumps about two to three feet off the ground. In addition to its uses as a sports, exercise, or amusement device, the invention also can be used for producing special effects in the entertainment industry and also has military applications.

A short discussion of mechanical aspects follows: The mechanical advantage of the lever action in series with the spring action is defined with respect to the motion and force of the user's foot in extension and retraction in relation to the resultant motion and force of the device against the ground, i.e., a mechanical advantage of 2:1 will generate a force against the ground which is twice the force of the user's foot against the device, while extension of the user's foot will extend the device against the ground by half as much. Attachment to the torso makes possible such a lever action since the extra force against the ground above and beyond that supplied by the user's leg and which is required by this action may then be transmitted from the user's torso. The role of the mechanical advantage in determining the series/parallel nature of this device can be seen by examining two extreme cases. For a mechanical advantage of 1:1, no additional force would be added to that provided by the user's leg, and the spring would act purely in series between the user's foot and the ground. Alternatively, a very large mechanical advantage, say 1000:1 would free the user's legs while placing the spring action between the torso and the ground, in parallel with any force that the user's foot might exert due to touching the ground directly. It is worth mentioning that all realizations of a lever action in series with a spring action are functionally equivalent, irrespective of where the spring or springs are placed in the mechanical circuit. Only the particular nature of the lever action needs to be clearly specified. By action in series is meant the usual definition of mechanical action in series, so that forces in both lever and spring are equal, except for constants of proportionality determined by the mechanical advantages of the constituent parts, while the extensions due to lever and spring motion are algebraically added.

SUMMARY OF THE INVENTION

Briefly, one embodiment of the invention provides a personal bipedal device comprising an external frame for attachment to the upper body of the user; a pair of leg frames which are longer than the user's legs so that they engage the ground instead of the user's feet and which have variable length so that they may extend and compress; spring means carried on the external frame and engaged with tension means extending to the leg frames so that compression of either of the leg frames may transfer energy to the spring means through the tension means; linkage attaching each leg frame to the user's foot such that fore-aft and left-right motion is directly effected by similar motion of the user's foot, and so that vertical motion is also controlled but indirectly in two ways, firstly by lever action the force of the user's leg is increased with an additional force transmitted from the external frame to the ground, and secondly by attachment to the tension means the leverage action is arranged to act in series with a spring action through actuation of the spring means carried on the external frame so that the downward motion of the user's body and foot may compress the leg frame and absorb the energy of his downward motion and then regenerate the energy stored in the spring during compression and cause the user to be lifted again while walking, running or jumping with a spring action with larger jumps and larger forces than could be generated by his legs alone due to the leverage action.

More specifically, and according to other embodiments of the invention, the personal bipedal device includes a back-mounted frame attached to the upper torso of the user, and separate articulated left and right leg frames pivotally attached to lower portions of the back frame. The user's feet are secured to the left and right leg frames so the bottoms of the leg frames contact the ground, rather than the user's feet. Each leg frame is articulated to allow compression and extension. The parts of the leg frame that contact the user's feet are also articulated to distribute the lift, caused by contact with the ground, between the user's foot and the back frame, while allowing the user's leg to compress and extend. In this way, the combined weight of the device, any load attached to the back frame, and part of the weight of the user's torso is borne directly by the leg frame and not by the user's feet and legs. The leverage of the foot-contacting linkage increases the force generated by the user's leg and foot to develop larger force on the ground than the user's leg would otherwise be able to generate, making it possible to increase vertical acceleration and load-carrying capability. Compression or extension of the user's leg gives rise to a similar movement of the leg frame, but by a smaller amount due to the leverage of the foot-contacting linkage. Elastic cord main springs mounted to the back frame are attached by tension lines to the left and right leg frames. The tension lines are arranged so that compression of the leg frames, caused by the force of downward movement of the user's feet and torso, pulls on either or both of the tension lines to stretch the main springs. The energy thereby stored in the stretched main springs is subsequently transferred back to the torso of the user and to the user's feet to cause the user to jump into the air by a distance above the ground which depends on the amount of compression of the leg frame and the amount of stretch transferred to the main springs.

Preferably, each leg frame has a corresponding rearwardly facing knee joint, or a linear bearing to allow its compression and extension. The leg frames are pivotally attached to the lower portions of the back frame by corresponding U-joints to allow independent fore-and-aft and side-to-side motion of each leg frame and to prevent twisting or rotation of the leg frame. The tension means for each leg are offset from its corresponding U-joint at the point of closest approach to prevent the lifting action of the leg frame on the back frame from pitching the user forward and to the side away from the leg frame.

Separate pick-up springs are preferably connected to each leg frame to raise and compress the leg frame and thereby keep the tension lines to each leg frame under positive tension so the tension lines to the leg frame will not go slack but remain constant in length, even when no vertical force is applied to the leg frame by the ground. A spring actuator is attached to the back frame and constrained to movement such a way as to stretch or release the main springs. The tension lines from both leg frames pull in common on the spring actuator so that if one line is pulled, motion of the actuator causes the other line to go slack, and vice versa. Thus, when one leg frame is compressed by action of the user's weight pushing down on the back frame and the user's foot, and the tension line for that leg frame is pulled, the tension line of the other leg frame tends to go slack. Then, a pick-up spring will automatically apply a pick-up force to the other leg frame to hold it above the ground to facilitate a natural walking gait that prevents the leg frame from dragging on the ground.

The invention makes possible a greater force on the ground than the user's feet and legs can generate as well as greater extension, and also makes possible large vertical acceleration and the carrying of substantial weight. The device provides force to the user's foot, as the leg is compressed and tension in the main springs increases. As the external leg is compressed, the increased force from the ground is divided between the torso and the foot. This allows the user's leg to effectively generate power over the entire range of operation of the device. The device controls lift forces and distributes them so that the device is stable and thereby safe to use, without preventing a normal walking or running motion, or producing undue accelerations or transferring substantial shock loads to the body during use.

These and other aspects of the invention will be more fully understood by referring to the following detailed description and the accompanying drawings.

DETAILED DESCRIPTION

Figure 1:
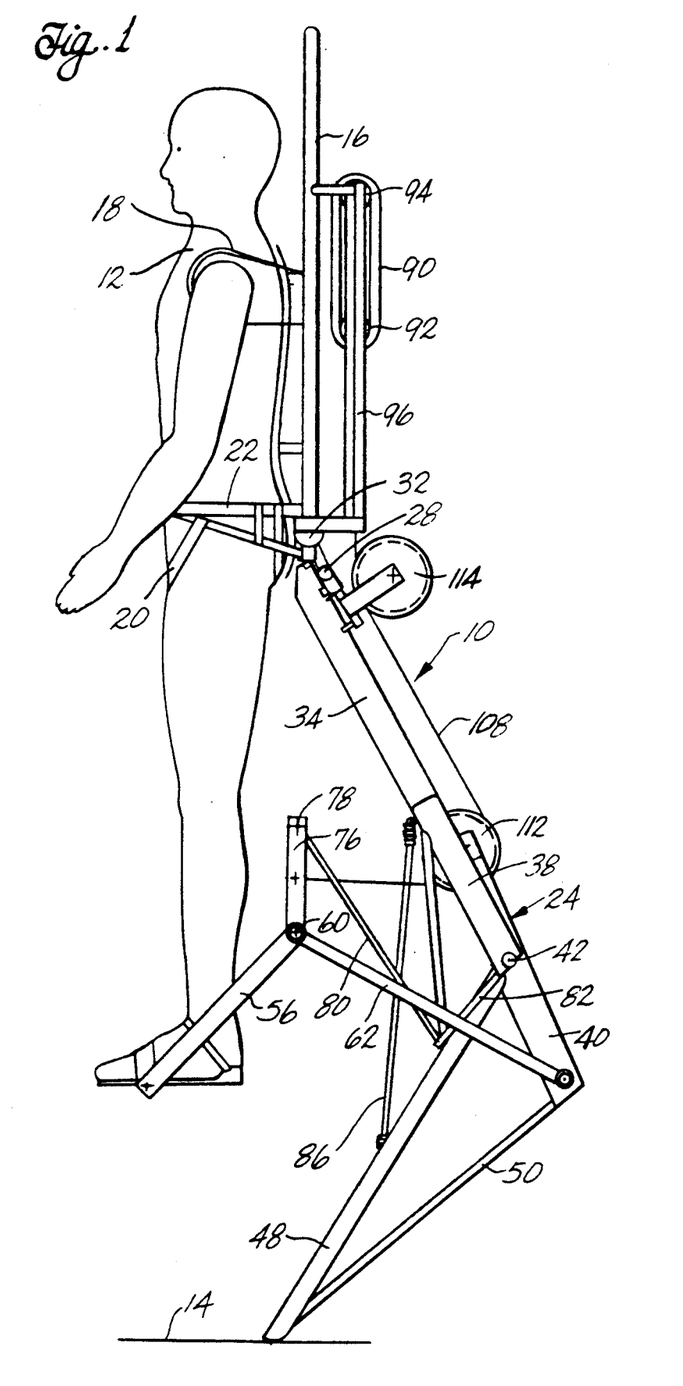
FIG. 1 is a side elevational view illustrating a human bipedal locomotion device according to this invention in which the device is illustrated in a normal at-rest position.
Figure 2:
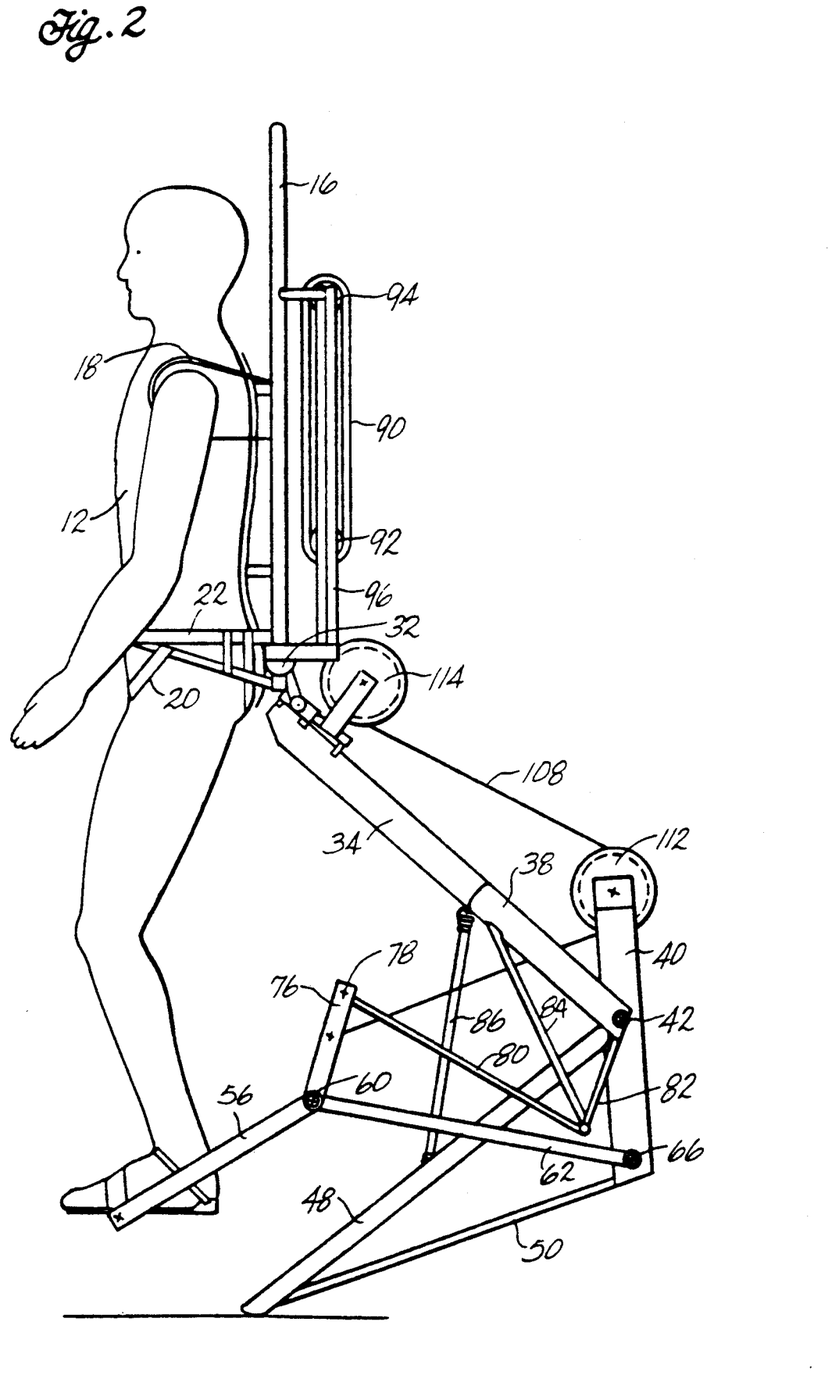
FIG. 2 is a side elevational view illustrating use of the device in its compressed state.

FIGS. 1 and 2 illustrate one embodiment of a human bipedal device 10 according to principles of this invention. The device is worn by a person 12 to enhance walking, running or jumping from the ground 14. FIG. 1 illustrates the device in a normal at-rest (uncompressed) position in contact with the ground. FIG. 2 illustrates the device in a compressed state prior to lifting the person from the ground either during jumping, walking or running. FIGS. 1 and 2 illustrate one side of the device for simplicity. Both sides of the device are illustrated in the rear perspective view of FIG. 3 which is also shown in the normal at-rest position.

Figure 3:
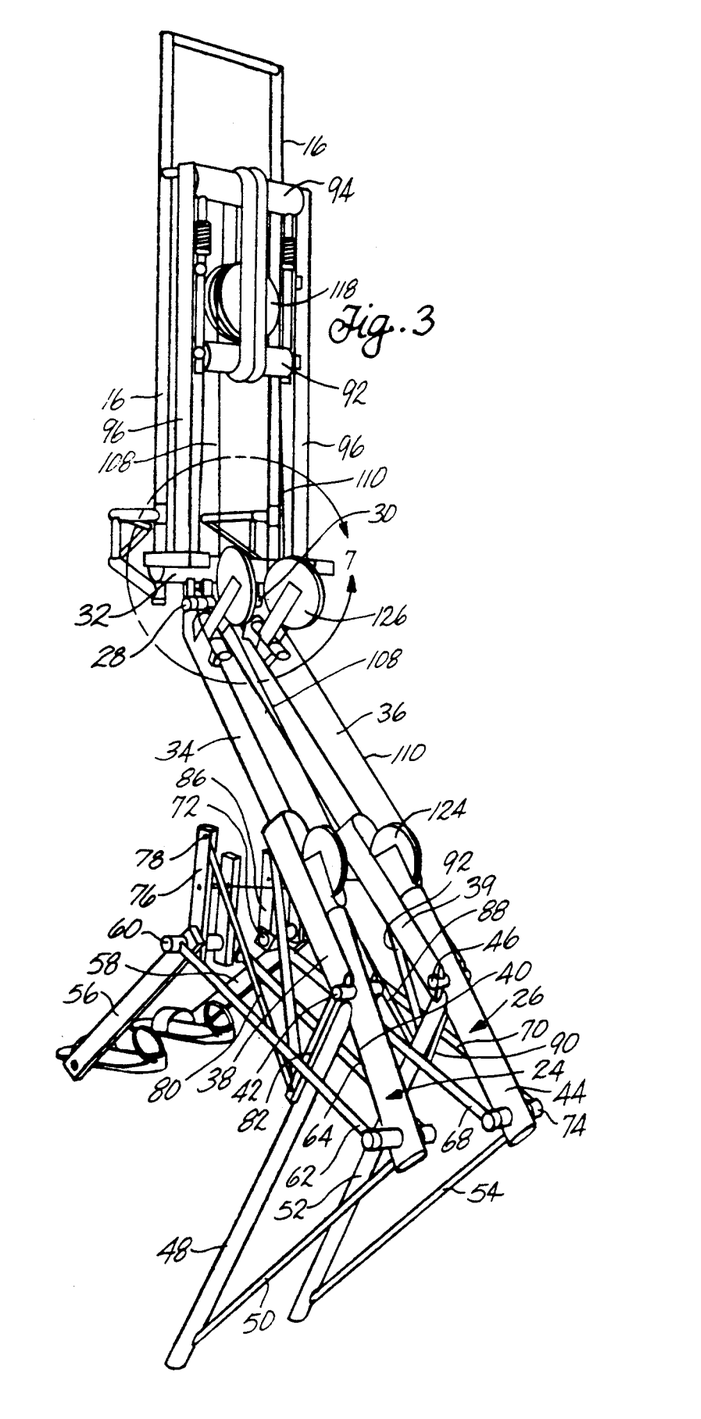
FIG. 3 is a perspective view of the device in its at-rest position.

The bipedal device includes a generally rectangular rigid back frame 16 attached to the back of the user by suitable padding and a shoulder harness 18 and a lower pelvic harness 20 having a waist strap 22. This holds the back frame in a comfortable and fixed upright position on the back of the user.

Left and right leg frames 24 and 26, respectively, are pivotally attached to pivot points on the lower left and right sides of the back frame. These leg frames are longer than the user's legs and so engage the ground instead of his own feet, and may compress and extend independently of the compression or extension of his own legs. Preferably, the tops of the left and right leg frames pivot on the bottom of the back frame by left and right U-joints 28 and 30. The top of the left U-joint 28 is rigidly affixed to the lower left side of a rigid horizontal crossbar 32 at the base of the back frame. The top of the right U-joint is rigidly affixed to the lower right side of the crossbar 32. The bottom of the left U-joint is rigidly affixed to the top of an elongated rigid upper leg link 34 of the left leg frame, and the bottom of the right U-joint is rigidly affixed to the top of an elongated rigid upper leg link 36 of the right leg frame. The U-joints allow the left and right leg frames to pivot independently of each other relative to the bottom of the back frame. The top of each leg frame can pivot fore and aft about a respective horizontal axis through the U-joints. This rotation can be seen by comparing the different angles of rotation between the left upper leg link 34 and the back frame shown in FIGS. 1 and 2. The U-joints also allow the tops of the left and right leg frames to pivot side to side independently.

The left and right leg frames 24 and 26 pivot between the at-rest position of FIG. 1 and the compressed state of FIG. 2 through a backward facing knee joint. The knee joint construction of a leg frame is best understood by also referring to the enlarged perspective view of the left leg frame shown in FIG. 4. These figures represent one embodiment of the leg frames and a further embodiment is described in more detail below. The bottom of the left and right upper leg links 34 and 36 have corresponding downwardly facing yokes 38 and 39. The bottom of the yoke on the left leg frame is attached to about the midpoint of an elongated left lever arm 40 through a transfer pivot pin 42. Similarly, the bottom of the yoke on the right leg frame is attached to the midpoint of the right lever arm 44 through a pivot pin 46. These connections allow the lever arms to pivot relative to the upper leg links.

Figure 4:
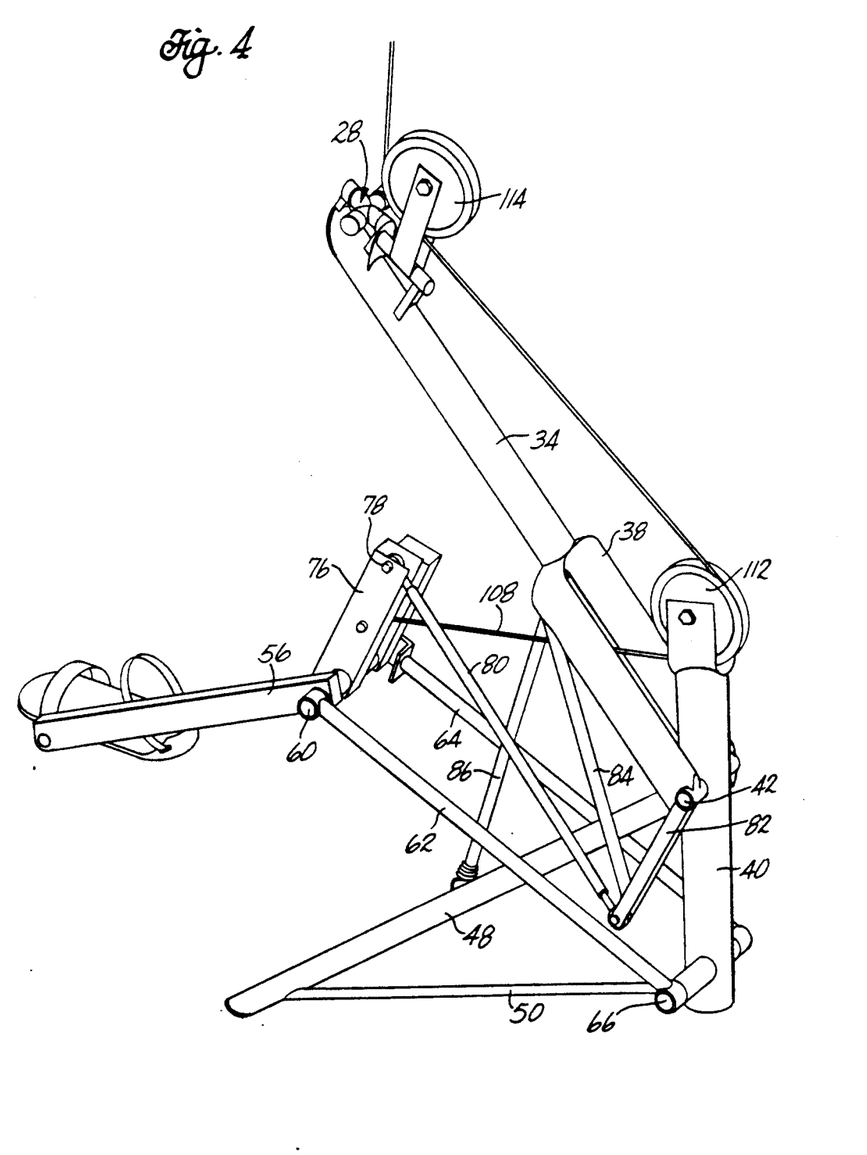
FIG. 4 is an enlarged fragmentary perspective view illustrating details of construction of a leg frame of the device.

The left leg frame engages the ground through a rigid triangular structure which includes a first lower leg link 48 extending downwardly toward the ground and converging toward a second lower leg link 50. The bottoms of the two lower leg links are rigidly affixed to each other a short distance above the ground, and the bottom of the first leg link engages the ground at a point below and spaced to the rear of the user's foot. The top of the first lower leg link 48 is rigidly affixed to about the midpoint of the left lever arm 40 near the pivot pin for the yoke attachment. The top of the second lower leg link 50 is rigidly affixed to the bottom of the left lever arm 40. The left leg frame thus forms a backward facing knee joint in which the upper member is formed by the left upper leg link 34 and the lower member is formed by the triangular structure which includes the lever arm and the first and second lower leg links. The knee joint pivots about the pivot pin 42 and during compression the upper leg link moves downwardly through an angle toward the lower member about the knee joint pivot. During compression the pivot through the midpoint of the lever arm also allows the top of the lever arm to rotate outwardly toward an upright position shown in FIG. 2.

The right leg frame has similar components which include the right lever arm 44, the transverse pivot pin 46 fastening the yoke to the lever arm, and first and second lower leg links 52 and 54 forming ground-engaging lower members of the right side reverse knee joint.

The leg frames are independently actuated by foot operated linkages which include an elongated rigid left foot link 56 and a similar right foot link 58. The foot links include lateral foot rest bars at their bottom on which the user's feet are supported during use. The left and right foot links extend upwardly at an angle away from the user's feet. A transverse axle 60 pivotally connects the top of the left foot link to the tops of a pair of rigid elongated lower parallel links 62 and 64. The left lower parallel links 62 and 64 extend downwardly at an angle away from the foot link bar to opposite sides of the left lever arm 40. A transverse axle 66 pivotally secures the rear ends of the left parallel links 62 and 64 to the bottom of the left lever arm 40. The right foot-operated linkage is similar and includes a pair of right lower parallel links 68 and 70, a front axle 72 securing the front ends of the parallel links to the top of the right foot link 58, and a rear axle 74 pivotally securing the rear ends of the parallel links to the bottom of the right lever arm 44.

The left leg frame further includes an upright left tension bar 76 pivotally secured at its bottom to the front axle 60 and rigidly attached to left foot link 56. The tension bar 76 extends upwardly behind the user's left leg. A pivot pin 78 pivotally secures the top of a rigid elongated left upper link 80 to the top of the left tension bar 76. The left upper link 80 extends downwardly at an angle away from the tension bar toward the bottom of a rear link 82. The bottom of the left upper link 80 is pivotally affixed to the bottom of the rear link 82. The top of the rear link 82 is pivotally secured to the midpoint of the left lever arm 40 by the axle 42. A rigid brace 84 is rigidly affixed between the yoke 38 at the bottom of the left leg bar 34 and the bottom of the rear link 82.

Similarly, the right leg frame further includes, a right upper link 88, a right rear link 90 and a right brace 92.

The left leg frame further includes an elongated left pickup spring 86 which extends between about the midpoint of the left leg bar 34 and about the midpoint of the first lower link 48 near the bottom foot portion of the left leg frame. The pickup spring is able to lift the triangular lower ground-engaging portion of the leg frame when tension on the triangular lower leg member tends to go slack, as described in more detail below. A similar right foot pickup spring (not shown) extends between similar components of the right leg frame.

The leg frame's extension responds to the extension of the user's leg and foot. As the user's leg extends, the left foot link 56 and the rigidly attached tension bar 76 are rotated forward as constrained by parallel links 62 and 64 and by upper link 80, pulling cable 108 around pulley 112. This tends to pull pulley 112 forward and the lower leg limb extends by pivoting about the pin 42. If the user's leg is contracted and raised, the bar 76 rotates back about its pivots at 60 and 78, releasing tension on the cable, and tending to allow force from the ground or from the pickup spring to contract the leg.

Extension of the leg frame tends to be smaller than that of the user's leg with a leverage action primarily due to a relatively smaller pulling motion by tension bar 76 on cable 108 compared to extension of the user's foot. Leverage is also increased by the action of pulley 112, which tends to move by an amount less than that of the pull on cable 108 by tension bar 76. In each case the smaller motion is accompanied by a corresponding increase in force or tension. The leverage for the geometry shown is approximately 2:1, providing approximately twice the force and half of the motion of the user's foot to the ground 14 via contact at the bottom of leg limb 48. The leverage may be varied by adjusting the attachment point of cable 108 to tension bar 76 and by adjusting the attachment point of pulley 112 to left lever arm 40. The exact value of the leverage varies somewhat, depending on the extension or compression of the leg frame. A further function of pulley 112 is to place this leveraged action of the user's foot in series with action due to a common spring means which will subsequently be described. By the nature of the pulley, its motion and the consequent response of the lower leg limb depend equally on a pull from either the lower end of cable 108, as initiated by motion of the user's foot, or the upper end, as controlled by the common spring means to be described. This added, or summed, motion defines mechanical action in series.

Figure 5:
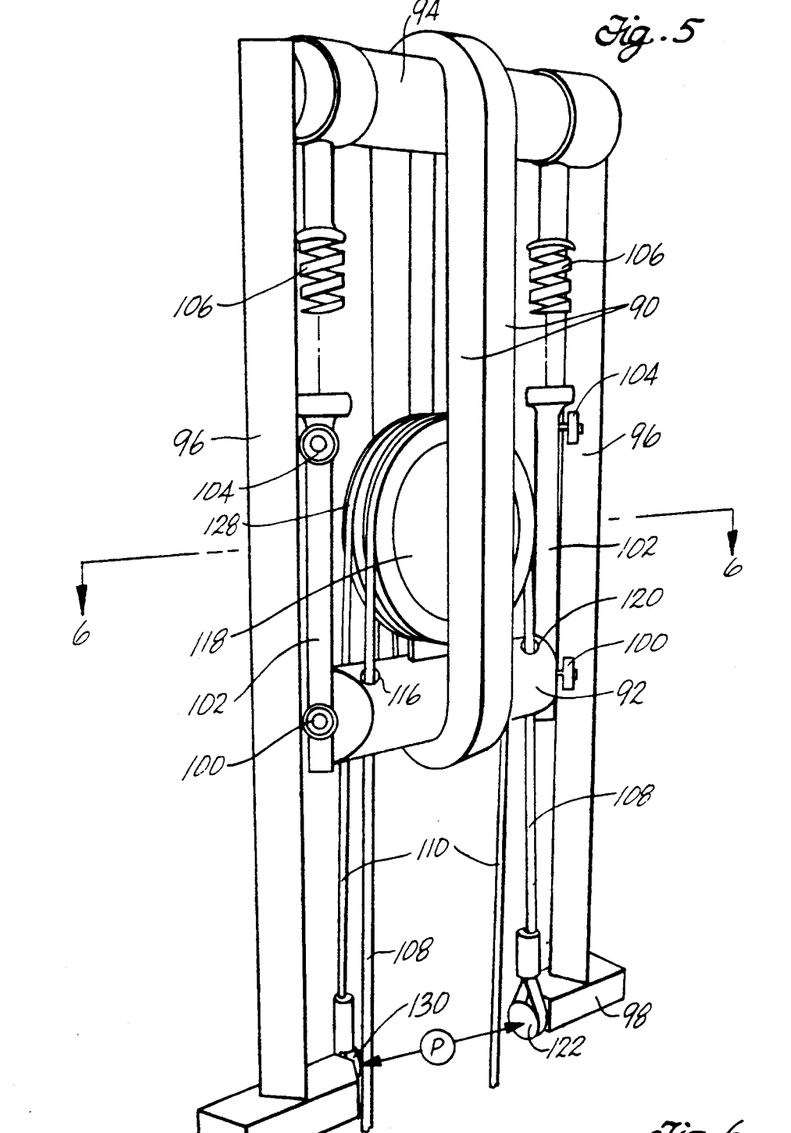
FIG. 5 is a perspective view illustrating a main spring assembly.

The back frame 16 carries a common spring means and a spring actuator for acting on the spring means in response to compression of either leg frame during use. As will be described in more detail below, the spring means are placed under tension in response to compression of either leg frame to thereby store energy which is then subsequently transferred, in part, to the leg frame for extending it (during the next step or jump) and, in part, to the back frame for applying lift to the upper torso of the user. It may also be placed in tension by extension of the user's leg and foot if the leg frame is prevented from making a corresponding extension by its engagement with the ground. In the illustrated embodiment best illustrated in FIGS. 3 and 5, the spring means comprise one or more endless cord-like main springs 90 which extend around a spring actuator comprising a vertically movable horizontal tension bar 92 for applying tension to the springs. Although a pair of endless main springs are shown, various numbers of separate springs may be used depending in part upon their spring tension. In the illustrated embodiment, each main spring may be a one-thousand pound spring cord although other levels of spring force may be used.

Figure 6:
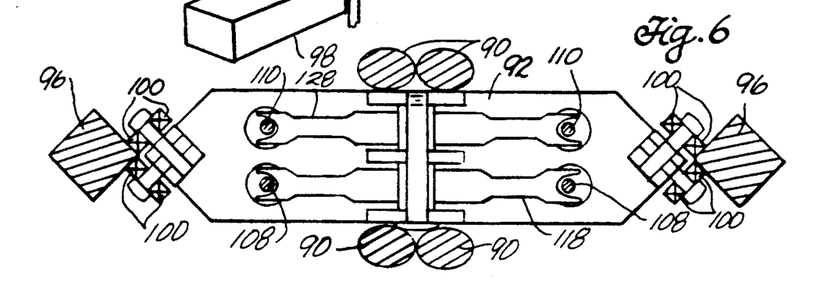
FIG. 6 is a cross-sectional view taken on line 6—6 of FIG. 5.

The vertically movable horizontal tension bar 92 slides inside a rectangular outer frame which includes a horizontal fixed upper bar 94 rigidly affixed to the top of vertical side frame bars 96 which, in turn, are affixed to the rear side of the back frame 16. The bottom of the frame comprises the pair of short inwardly extending horizontal bars 98 affixed to the bottoms of the vertical side bars 96. The side bars 96 act as rails for guiding vertical sliding movement of the horizontal tension bar 92. As best illustrated in the cross sectional view of FIG. 6, the vertical rails are rectangular in cross section and mounted with a 45 degree rotation relative to a vertical plane through the rectangular frame. The ends of the tension bar also extend at 45 degree angles toward the adjacent corners of the side bars. Separate pairs of lower bearing blocks 100 are mounted at 45 degree angles to the outer ends of the tension bar for sliding on the inside rails of the frame. A pair of vertically extending bearing support bars 102 affixed to the outer corners of the tension bar extend upwardly and mount separate pairs of upper bearing blocks 104 also mounted at 45 degree angles and arranged for sliding on the inside rails of the frame. Vertical sliding travel of the spring actuator on the rails inside the frame is stabilized by a pair coil springs 106 fastened between the upper horizontal bar 94 and the top of the bearing support bars 102.

Tension lines extend separately from each leg frame to the spring means for developing energy in the spring means in response to tensioning of the tension means produced by compression of each leg frame and extension of the user's foot and leg during use. The tension means include a left tension line 108 affixed at one end to the tension line bar 76 at the front of the left leg frame. A right tension line 110 is affixed at one end to the tension line bar 86 at the front of the right leg frame. The left tension line extends rearwardly away from the left tension bar and around a left lower guide pulley 112 mounted to the upper end of the left lever arm 40. The tension line continues upwardly from the lower guide pulley into contact with a left upper guide pulley 114 affixed to the outer side of the left leg bar 34 adjacent the left U-joint 28. The left tension line then extends upwardly through an opening 116 in the left side of the spring tension bar 92, around the top of a front main pulley 118 mounted inside the spring frame, and then extends downwardly away from the pulley through an opening 120 in the right side of the spring tension bar. The end of the line is rigidly affixed at 122 to the inside of the right bottom frame member 98 of the spring frame.

Similarly, the right tension line 110 extends away from the right tension bar 86 on the right leg frame, around a lower right guide pulley 124 and around a right upper guide pulley 126, through a passage in the horizontal spring tension bar 92, around a rear main pulley 128, and then downwardly through a passage in the tension bar 92 to a rigid anchor point at 130 on the inside of the left bottom frame member 98.

During use, the spring tension bar is constrained to move in such a way as to stretch the main springs under tension applied to the bar from either the right or left tension line. Tension is applied to the tension bar as a result of compression of either of the leg frames. During compression, the lever arm 40 or 44 of the left and right leg frames will move rearward and apply tension to their respective tension lines to pull down on the tension bar which then stretches the main springs. Thus, the tension lines from both leg frames pull in common on the spring actuator so that if one line is pulled, motion of the spring actuator tends to cause the other line to go slack. That is, when one leg frame is compressed by action of the user's weight pressing downward on the back frame and the user's foot, and the tension line for that leg frame is pulled, the tension line of the other leg frame tends to go slack. However, the pickup spring for the other leg frame applies a pickup force to the other leg frame to hold it above the ground to facilitate a natural walking gait that prevents the leg frame from dragging on the ground.

Thus, the present invention provides a human bipedal device in which the separate articulated left and right leg frames are independently pivotally attached to lower portions of the back frame. The user's feet are secured to the leg frames so the bottom of the leg frames contact the ground rather than the user's feet. Each leg frame is articulated to allow compression and extension. The parts of the leg frame that contact the user's feet are also articulated to distribute the lift, from contact with the ground, between the user's foot and the back frame, while allowing the user's leg to compress and extend. In this way, the weight of the device, any load attached to the back frame, and part of the weight of the user's torso may be borne directly by the leg frame and not the user's feet and legs. The leverage of the foot-contacting linkage increases the force generated by the user's leg and foot to develop larger force on the ground than the user's leg would otherwise be able to generate and makes possible increased vertical acceleration and load carrying capabilities. Compression or extension of the user's leg directly causes similar movement of each leg frame but by a smaller amount due to the leverage of the foot contacting linkage. However, this leverage acts in series with the action of the main spring to effect a spring action between the user's feet and the ground. Thus, in a bouncing gait the motion of the leg frame due to the combined effect of motion of the user's leg and motion of the main spring is greater than that due to the motion of the user's leg alone. With an appropriate main spring it may actually be greater than the motion of the user's leg, notwithstanding that the force is also greater. This advantage of providing both increased extension and force, compared to the user's leg, is unique to this device. In such a bouncing gait, energy due to downward motion of the user is stored in the main springs and is subsequently transferred back to the torso of the user and to the user's feet to cause the user to jump into the air by a distance above the ground approximately proportional to the compression of the leg frame and the amount of stretch transferred to the main springs. The energy stored in the main springs is subsequently transferred back to the torso of the user and to the user's feet to cause the user to jump into the air by a distance above the ground approximately proportional to the compression of the leg frame and the amount of stretch transferred to the main springs.

FIGS. 12 through 15 illustrate a normal sequence of steps during use of the invention. These steps, in order, show the at-rest condition of the device with the left foot forward, compression of the jumping device, lift transferred from the device to cause a large jumping-type step, and landing on the ground with the right foot forward ready for the next step.

Figure 7:
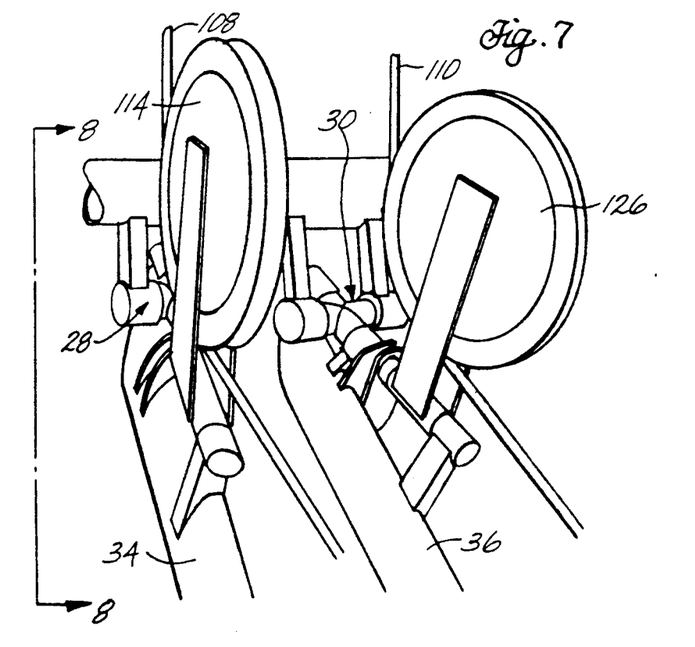
FIG. 7 is a fragmentary perspective view showing detailed construction taken within the circle 7 of FIG. 3.
Figure 8:
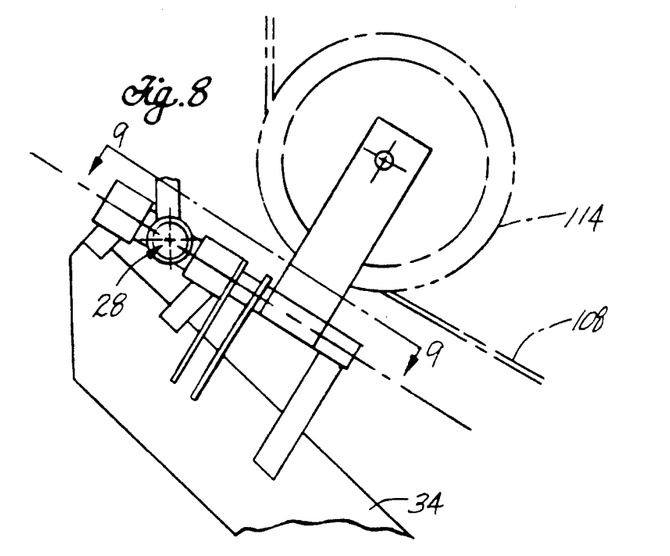
FIG. 8 is an enlarged fragmentary side elevation view taken on line 8—8 of FIG. 7.
Figure 9:
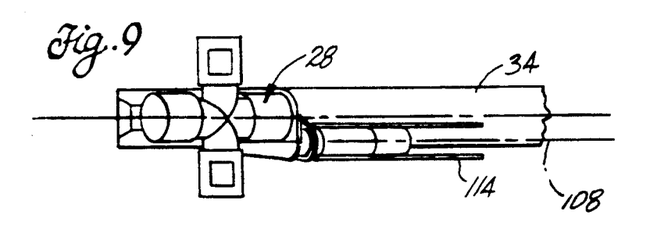
FIG. 9 is an enlarged fragmentary top elevational view taken on line 9—9 of FIG. 8.

As mentioned previously the leg frames are pivotally attached to the lower portions of the back frame by the corresponding U-joints to allow independent fore and aft and side motion of each leg frame. The arrangement of each tension line relative to its corresponding U-joint is best illustrated in FIGS. 7 through 9 which show that each tension line for each leg frame is offset from the corresponding U-joint at the point of closest approach to prevent the lifting action of the leg frame on the back frame from pitching the user forward and to the side away from the leg frame.

Figure 10:
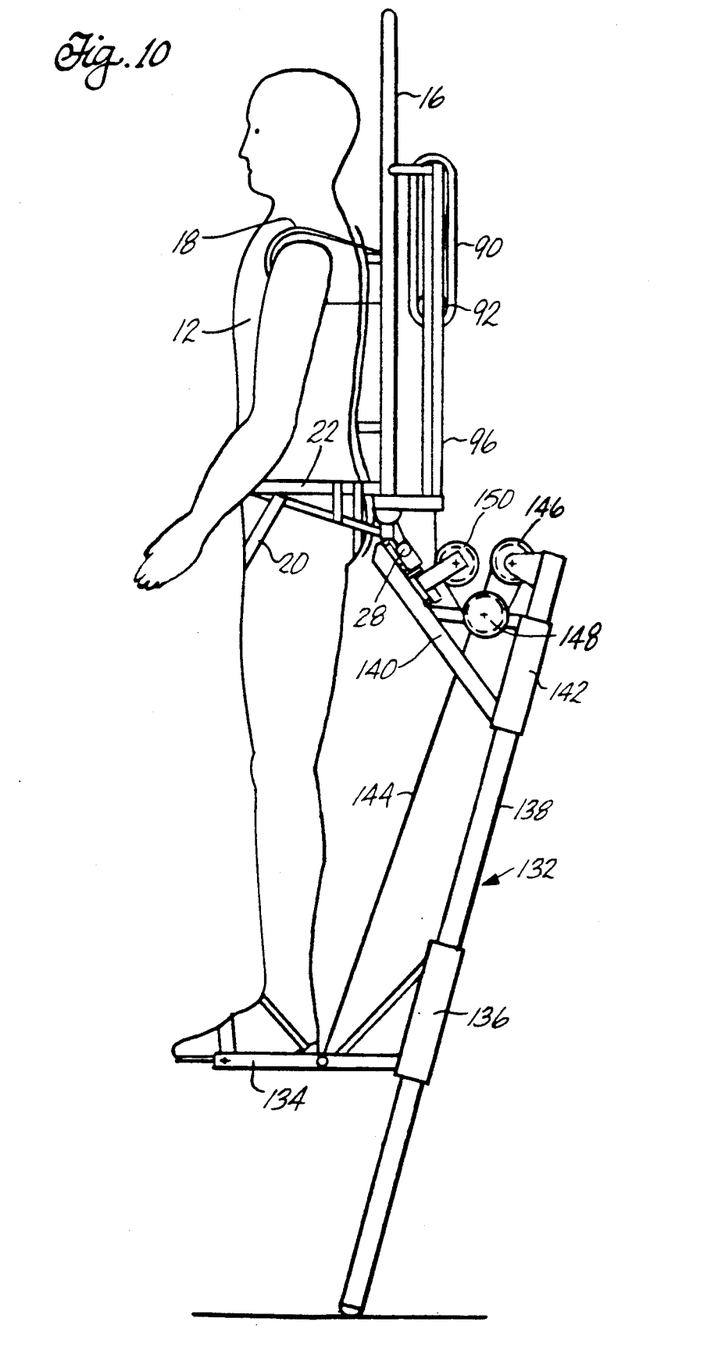
FIG. 10 is a side elevational view illustrating an alternative embodiment of the invention in which the device is in an at-rest position.
Figure 11:
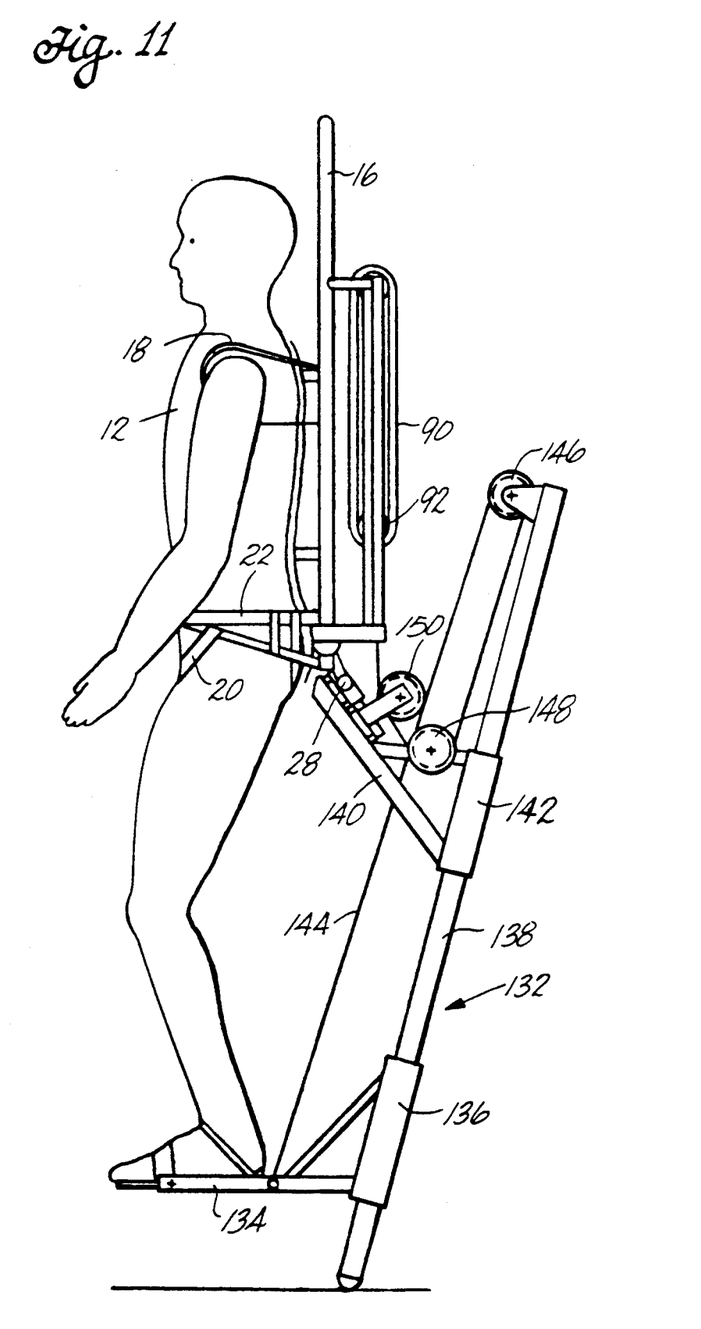
FIG. 11 is a side elevational view of the device shown in FIG. 10 in its compressed state.
Figure 12:
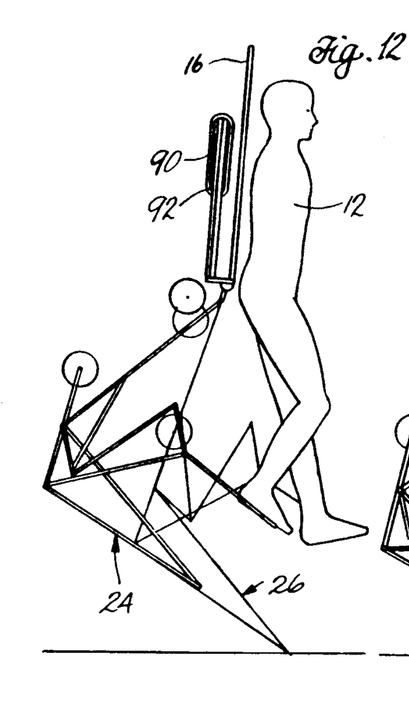
FIGS. 12 through 15 are semi-schematic side elevational views illustrating the function of the invention during a sequence of steps taken when using the invention.
Figure 13:
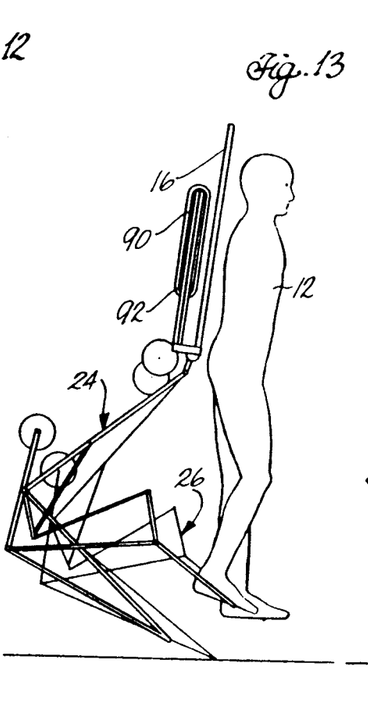
Figure 14:
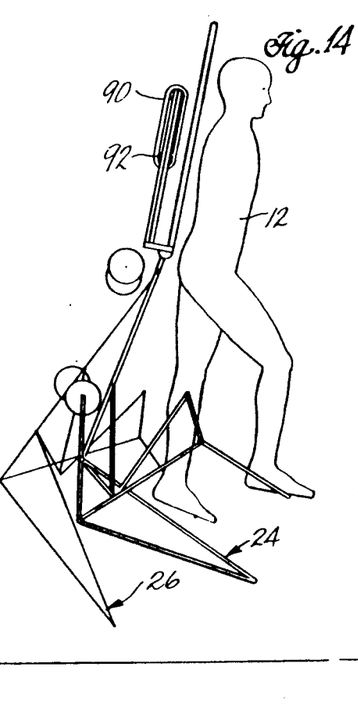
Figure 15:
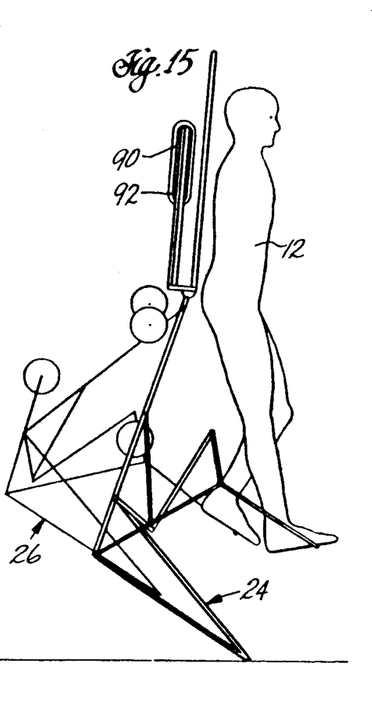

FIGS. 10 and 11 illustrate an alternative form of the invention in which left and right articulated leg frames are comprised of linear bearings instead of the backwardly facing knee joints described above. In this embodiment, the back frame, main springs 90 and spring actuator bar 92 operate in a manner similar to the embodiment described previously in which the main springs are stretched in response to tension applied to tension lines on the left and right leg frames. In the embodiment of FIGS. 10 and 11, the left leg frame is illustrated and the right leg frame is similar. The left leg frame 132 includes a footrest 134 rigidly affixed to the bottom of a lower linear bearing 136 which slides along an elongated leg bar 138 extending upwardly behind the user. An upper leg link 140 extends from the left U-joint 28 downwardly at an angle away from the user and is affixed at its bottom to a lower portion of an upper linear bearing 142 also slidable on the left leg bar 138. The left tension line 144 is affixed at its bottom to the foot support 134 and this tension line extends upwardly into contact with an upper guide pulley 146 affixed to the top of the left leg bar 138. A tension line extends around the upper guide pulley and then extends downwardly for engagement with the bottom of a lower guide pulley 148 affixed to the upper movable linear bearing 142. The left tension line then continues on, extending away from the lower guide pulley around a guide pulley 150 mounted adjacent the left U-joint in a manner similar to the guide pulley 114. The tension line 144 then extends upwardly into contact with the main pulley carried on the back frame and is adapted for stretching the main springs 90 in a manner similar to that described previously.

On account of the simplified geometry of this alternative form of the invention, the leverage action due to motion of the user's foot acting in series with spring action due to the main spring on the back pack are somewhat easier to see. Here, force of the user's foot is applied to the footrest 134 and directly applied to the tension line 144. The upper guide pulley 146 acts to generate a downward force on leg bar 138 which is just twice that due to the user's foot, for a mechanical advantage of exactly 2:1. Upper guide pulley 146 also acts to add the leveraged motion due to the user's foot on the lower end of the tension line 144 to that due to action of the main spring on the upper end of the tension line. This added motion defines mechanical action in series with the effect of the main spring on the back frame.

The right leg frame of the embodiment of FIGS. 10 and 11 is similar to that described for the left leg frame.

FIG. 10 shows the leg frame during use in an at-rest position in which the main springs 90 are not stretched, and FIG. 11 illustrates compression of the leg frame causing the tension lines to stretch the main springs. During compression, the upper and lower linear bearings slide downwardly along the left leg bar, and this downward force causes the pulley 148 to move downwardly and away from the fixed upper pulley 146 so as to lengthen the distance between the two pulleys. This shortens the distance between the pulley 150 and the spring actuating bar 92, causing the spring actuating bar 92 to move downwardly and stretch the main springs 90.

Thus, in the embodiment of FIGS. 10 and 11, the tension line associated with each leg frame independently applies a force to the spring actuating bar to stretch the main springs independently, and forcible compression of one leg frame due to the downward motion of the user develops energy in the main springs so that, at a subsequent time, the energy in the main springs can be recovered through extension of the leg frame and transferred to the foot and torso of the user to cause the user to spring upward again. The two leg frames are connected to the main springs in such a way as to act on it in parallel so that compression of either leg frame induces a consequent and similar compression of the other leg frame by means of their common attachment to the spring means. This common attachment can prevent dragging of the other foot on the ground to allow bipedal transportation with large leg frame compression, large steps and high jumps.

As a further alternative embodiment, a power assist means may be used to increase leg frame lift and extension with reduced effort on the part of the user. The power assist can be produced by a small motor of about, say, 2.0 horsepower, applied to the anchor points at 122 and 130 of the tension line cables (see FIG. 5). This power assist can provide a cable wind-up and release at the ends of the two tension lines so as to either extend or release the cables under power. In response to foot pickup, the cable unwinds and increases the amount of leg frame motion generated by the pickup springs to pick up the leg frame from the ground for added maneuverability and safety. In response to extension of the user's foot it will pull the cable and so extend the leg frame more than would be possible by the leveraged motion of the user's foot for added performance and reduced effort.

In a further embodiment, the single main spring may be replaced by springs attached to each leg frame which are actuated by compression of the corresponding leg frame. In addition, a mechanical coupling can be provided between the two springs which constrains them to move in tandem so that when one is actuated, the other must also be actuated. In this way, compression of one leg frame by the user's weight induces a similar compression of the other leg frame to hold it above the ground and thereby prevent its dragging on the ground.

What is claimed is:

1. A personal bipedal device comprising:
    an external frame for attachment to the upper body of a user;
    a pair of leg frames pivotally attached to the external frame and arranged to be compressed to absorb energy when landing on the ground under the weight of the user, each leg frame being longer than the corresponding leg of the user and having a first portion attached to the user's foot region and a second portion adapted to contact the ground spaced from and below the first portion thereof; and
    spring means carried on the external frame and cooperatively engaged with tension means which extends to the leg frames so that compression of either of the leg frames upon contact between said second portion of the leg frame and the ground transfers energy to the spring means through the tension means to apply lift to the user's body and a spring action between the user's feet and the ground so the user is lifted while walking or running with a spring action.

2. Apparatus according to claim 1 in which each leg frame is attached to the external frame by a corresponding U-joint to allow independent fore-and-aft and side-to-side motion of the leg frame.

3. Apparatus according to claim 2 in which each tension means is associated with a corresponding leg frame independently and applies a pulling force to the spring means to transfer energy to the spring means independently of the other tension means.

4. Apparatus according to claim including separate pick-up springs engaged with each leg frame to apply a pick up force to the leg frame to lift the leg frame above the ground in the event the tension line corresponding to the leg frame is in a slack condition.

5. Apparatus according to claim 2 in which the tension means comprise a tension line passing over a corresponding pulley, and each pulley is offset from a corresponding U-joint to prevent the lifting action from pitching the user forward and to the other side of the bipedal device.

6. Apparatus according to claim 1 in which each leg frame is articulated and in which compression and extension of the articulated leg frame is produced by a rearward-facing knee joint.

7. Apparatus according to claim 1 in which each leg frame is articulated and in which compression and extension of the articulated leg frame is produced by a linear bearing between relatively movable parts of the leg frame.

8. Apparatus according to claim 1 in which the spring means includes a spring actuating member carried on the external frame and engaged with a main spring also carried on the external frame, and in which the spring actuating member is arranged to move so as to stretch the main spring in response to tension in either of the tension means associated with the leg frames.

9. Apparatus according to claim 8 in which the tension means associated with each leg frame independently applies a force to the spring actuating member to stretch the main spring independently, and in which forcible compression of one leg frame due to the downward motion of the user can cause the tension means for that leg frame to be pulled, causing a motion of the spring actuating member that causes the tension means associated with the other leg frame to become slack; and including a pick-up spring for causing the other leg frame to compress and lift to prevent dragging of the other leg frame on the ground to thereby allow bipedal transportation with large leg frame compression, large steps and high jumps.

10. A human bipedal jumping device comprising:
    a back frame for attachment to the upper torso of a user;
    an articulated right leg frame pivotally attached to a lower portion of the back frame;
    an articulated left leg frame pivotally attached to a lower portion of the back frame adjacent the right leg frame;
    means for attaching each leg frame to a corresponding foot of the user;
    means for contacting the ground with a portion of each leg frame behind the point where the user's foot is attached to the corresponding leg frame;
    spring means carried on the back frame;
    a spring-actuating member carried on the back frame and arranged to move so as to stretch the spring means;
    pivot means on each leg frame arranged so the leg frame can move between a normal at-rest position and a compressed condition caused by downward movement of the user's feet and the weight of the user's body downwardly on the leg frames; and
    tension means extending separately from each leg frame to the spring-actuating member and arranged to be placed in tension when either of the leg frames is compressed to thereby move the spring-actuating member to stretch the spring means to develop energy in the spring means which is then transferred back to the upper torso of the user and to the user's feet to cause the user to jump into the air by a distance above the ground proportional to the amount of compression of the leg frame and the amount of stretch transferred to the spring means.

11. Apparatus according to claim 10 in which each leg frame is attached to the back frame by a corresponding U-joint to allow independent fore-and-aft and side-to-side motion of the leg frame.

12. Apparatus according to claim 11 in which each tension means associated with a corresponding leg frame independently applies a pulling force to the spring-actuating member to stretch the spring means independently.

13. Apparatus according to claim 11 in which each tension line passes over a corresponding pulley, and each pulley is offset from a corresponding U-joint to prevent the lifting action from pitching the user forward and to the other side of the jumping apparatus.

14. Apparatus according to claim 10 including separate pick-up springs engaged with each leg frame to apply a pick-up force to a leg frame to lift the leg frame above the ground in the event the tension line corresponding to the leg frame is in a slack condition.

15. Apparatus according to claim 10 in which each tension means is associated with a corresponding leg frame and independently applies a pulling force to the spring means to transfer energy to the spring means independently of the other tension means.

16. A personal bipedal device comprising:
an external frame for attachment to the torso of the user;
a right leg frame pivotally attached to a lower portion of the back frame, which is articulated to allow compression and extension, and which is longer than the and so that the leg frame, instead of the user's leg contacts the ground and which includes means at its lower extremity to contact the ground;
a left leg frame pivotally attached to a lower portion of the back frame, which is articulated to allow compression and extension, and which is longer than the user's leg and so that the leg frame, instead of the user's leg, contacts the ground and which includes means at its lower extremity to contact the ground;
energy control means mechanically coupled through a tension means to the compression and extension motion of each articulated leg frame, to absorb the energy of downward motion of the user upon landing on the ground and to restore the energy when subsequently springing upward again;
foot attachment means connecting each of the leg frames to a foot of the user, which is articulated to allow compression and extension of the user's leg while providing approximately direct and rigid mechanical control of the side-to-side and fore-aft motions of the leg frame by similar motions of the user's foot;
leverage means associated with each leg frame and its foot attachment means to couple the extension and compression motion of the user's foot to a similar extension or compression of the leg frame with a mechanical advantage of greater than 1:1, so that the force exerted by the leg frame against the ground is greater than that exerted by the user's foot, and which is connected to act in series with said tension means coupling of the leg frame to the energy control means.

17. Apparatus according to claim 16 in which the energy control means is a spring means.

18. Apparatus according to claim 17 in which the spring means is mounted on the external frame and connected to each leg frame by a tension means extending from the spring means to a corresponding leg frame.

19. Apparatus according to claim 18 in which a common spring means is mounted on the external frame and which is acted upon in parallel by the tension means attached to the two leg frames.

20. Apparatus according to claim 16 in which compression and extension of the articulated leg frames are produced by a rearward-facing knee joint.

21. Apparatus according to claim 16 in which compression and extension of the articulated leg frames are produced by a linear bearing between two parts of the leg frame.

22. Apparatus according to claim 16 in which each leg frame is attached to the back frame by a corresponding U-joint to allow independent fore-and-aft and side-to-side motion of the leg frame.

23. Apparatus according to claim 16 in which the tension means comprises a tension line passing over a pulley attached to a corresponding leg frame, and each pulley is offset from a corresponding U-joint to prevent lifting action on the user's torso from pitching the user forward and to the side away from the corresponding leg frame.

24. Apparatus according to claim 16 including separate pick-up springs engaged with each leg frame to apply a pick-up force to a leg frame to compress the leg frame and lift it above the ground in the event the tension means corresponding to the leg frame is in a slack condition and so to remove the slack.

25. Apparatus according to claim 24 including a spring-actuating member which is carried on the back frame and arranged to move to thereby stretch the spring means and to which the tension means associated with both leg frames are attached.

26. Apparatus according to claim 25 in which the tension means associated with each leg frame independently apply a force to the spring-actuating member to stretch the spring means independently and in which forcible compression of one leg frame due to the downward motion of the user, may cause the tension means for that leg frame to be pulled, causing a motion of the spring-actuating member that will cause the tension means associated with the other leg frame to go slack and, through the action of a pick-up spring, cause the other leg frame to compress and lift and so prevent dragging of the other leg frame on the ground to allow bipedal transportation with large leg frame compression, large steps and high jumps.

27. A personal bipedal device comprising:
an external frame for attached to the upper body of a user;
a pair leg frames pivotally attached to the external frame and arranged to be compressed to absorb energy when landing on the ground under the weight of the user, each leg frame being longer than the corresponding leg of the user and including a first portion attached to the foot region of the user and a second portion adapted to contact the ground spaced from and below the first portion thereof, so the compression of the leg frame allows vertical motion of the user's body and feet while the second portion of the frame is still engaging the ground;
spring means carried on the external frame;

each leg frame having leverage means in which contact between the second portion of the leg frame and the ground, causing compression of the leg frame, applies a leveraged force to the ground through a mechanical advantage produced by said leverage means; and tension means connecting the leverage means of the leg frames in series with the spring means so that compression of each leg frame stores energy in the spring means to produce a vertical jumping force in series with the leveraged force produced by the leg frame to enhance vertical jumping force applied between the user and the ground.

* * * * *

UNITED STATES PATENT AND TRADEMARK OFFICE
CERTIFICATE OF CORRECTION

PATENT NO. : 5,016,869

DATED : May 21, 1991

INVENTOR(S) : G. John Dick; Eric A. Edwards

It is certified that error appears in the above-identified patent and that said Letters Patent is hereby corrected as shown below:

Column 2, lines 5,6, change "Disadvantage" to
-- Disadvantages --.
Column 2, line 18, before "extending" delete -- at --.

Column 12, line 29, change "back pack" to -- backpack --.

In the Claims

Column 13, line 66, insert "1" after "claim".

Column 15, line 13, change this claim to claim 14.
Column 15, line 18, change this claim to claim 13.
Column 15, line 34, after "the" delete "and" and insert therefor -- user's leg --.

Column 16, line 54, change "attached" to -- attachment --.
Column 16, line 56, after "pair" insert -- of --.

Signed and Sealed this

Twenty-second Day of December, 1992

*Attest:*

DOUGLAS B. COMER

*Attesting Officer*  *Acting Commissioner of Patents and Trademarks*